United States Patent

[11] 3,603,818

[72] Inventor Gerard White
Marlboro, N.J.
[21] Appl. No. 833,973
[22] Filed June 17, 1969
[45] Patented Sept. 7, 1971
[73] Assignee Bell Telephone Laboratories, Incorporated
Murray Hill, N.J.

[54] GUNN-DIODE LOGIC CIRCUITS
9 Claims, 7 Drawing Figs.

[52] U.S. Cl. .... 307/260, 307/206, 307/287, 317/235 V, 331/107 G, 307/317, 307/322, 307/324
[51] Int. Cl. .... H03k 5/00
[50] Field of Search .... 307/260, 262, 206, 299, 287; 331/107 G; 317/235, DIG. 10

[56] References Cited

UNITED STATES PATENTS 3,493,842 2/1970 Robrock .... 307/206

OTHER REFERENCES

IBM Technical Disclosure Bulletin " Bulk Negative Resistance Devices as High-Speed Logic Elements," Keyes et al. Vol. 11 No. 5 Oct. 1968 page 455

*Primary Examiner*—Donald D. Forrer
*Assistant Examiner*—B. P. Davis
*Attorneys*—R. J. Guenther and Kenneth B. Hamlin ABSTRACT: Two Gunn diodes are connected in series between oppositely poled bias sources. The sources are selected such that in the absence of high-field domains in the diodes the internal field in each diode is just above the threshold for domain propagation. When a high-field domain propagates in one diode, the internal field available in the other device is below the minimum value required to achieve domain nucleation. By applying a bias current to an input-output node point between the diodes, it is possible thereby to selectively give preference to domain nucleation in either diode. This basic two-diode arrangement is utilized to form a threshold detector, a bistable circuit, a pulse regenerator and an analog-to-digital converter.

INVENTOR
G. WHITE
BY Lucian C. Canepa
ATTORNEY

GUNN-DIODE LOGIC CIRCUITS

BACKGROUND OF THE INVENTION

This invention relates to the selective translation of electrical signals and more particularly to a class of circuits utilizing Gunn diodes as the active elements thereof.

As the complexity and sophistication of modern day information processing systems have increased, the search has intensified for reliable and simple high-speed circuits capable of performing various basic operations in such systems. This search has recently led investigators to consider the feasibility of employing suitably biased elements of a bulk-effect semiconductor material such as gallium arsenide as the active elements of these circuits.

It is known that the application of an appropriate direct-current bias voltage to such a two-terminal element produces high-frequency electromagnetic oscillations therein. These so-called Gunn-effect oscillations are generated by the nucleation and essentially constant-speed propagation within the element of successive narrow dipole narrows or domains characterized by extremely high electric fields. This effect is described, for example, in the paper "Instabilities of Current in III–V Semicondcutors" by J. B. Gunn, *IBM Journal of Research and Development*, Apr. 1964, pp. 141–159.

The utilization of Gunn diodes to form pulse regenerators and analog-to-digital converters has been reported (see "Pulse Gain and Analogue-to-Pulse Conversion by Gunn Diodes" by S. H. Izadpanah and H. L. Hartnagel, *Electronics Letters*, July 26, 1968, pp. 315–316). However, the output waveforms provided by these known circuits exhibit a pedestal or off-ground reference voltage on which the output signals are superimposed. As a practical matter such waveforms are disadvantageous in that they complicate considerably the task of interfacing the circuits with conventional solid-state components included in a typical processing system.

SUMMARY OF THE INVENTION

An object of the present invention is an improved class of high-speed circuits.

More specifically, an object of this invention is an improved class of circuits which include Gunn diodes as the active elements thereof.

Another object of the present invention is a class of Gunn-diode circuits whose output waveforms are symmetrically disposed with respect to a ground reference level whereby interfacing such circuits with conventional solid-state components is greatly facilitated.

Still another object of this invention is to provide a class of Gunn-diode circuits characterized by high input sensitivity, reliability and simplicity.

Briefly stated, these and other objects of the present invention are realized in a specific illustrative embodiment thereof that comprises two Gunn diodes connected in series between oppositely poled bias sources. The values of the sources are approximately equal and selected to be such that in the absence of high-field domains in the diodes, the internal field in each diode is just above the threshold for domain propagation. When a high-field domain propagates in one diode, the internal field available in the other device is thereby caused to be below the minimum value required to achieve domain nucleation therein. By applying a bias current to an input-output node point between the diodes, it is possible to selectively give preference to domain nucleation in either diode.

It is, therefore, a feature of the present invention that two Gunn diodes be connected in series between two oppositely poled bias sources that are adapted to enable one or the other but not both of the diodes to propagate domains, and that in input signal be applied to a node point between the diodes for controlling which one of them is to propagate domains.

BRIEF DESCRIPTION OF THE DRAWING

A complete understanding of the present invention and of the above and other objects, features and advantages thereof may be gained from a consideration of the following detailed description of several specific illustrative embodiments thereof presented hereinbelow in connection with the accompanying drawing, in which.

DETAILED DESCRIPTION

As indicated above, the application of an appropriate direct-current bias voltage to a two-terminal element of a bulk-effect semiconductor material causes the nucleation and propagation in the element of successive narrow domains each characterized by an extremely high electric field. In particular, it is known that an element of certain semiconductors (for example, gallium arsenide, indium antimonide or indium phosphide) will produce microwave currents when direct-current electric fields of the order of a few thousand volts per centimeter are applied thereto. Since the elements employed in accordance with this invention are typically 0.005 centimeters in thickness (between terminals), the applied direct-current voltage need be only in the range of tens of volts. Each microwave oscillation generated within such an element includes buildup and decay portions and an essentially constant-amplitude portion therebetween. The frequency of the oscillations lies in the gigaHertz range and is stable.

The aforementioned oscillations are generated by the nucleation and propagation of a narrow dipole layer or domain. This layer, which, for example is typically of the order of 20 microns wide, is a combination of a layer of excess carrier density with an adjacent layer of deficient carrier density. The electric field between the layers is extremely large, constituting a field spike in the range of 10 to 100 kilovolts per centimeter. Once the dipole layer is fully developed near the cathode, it propagates to the anode of the element at approximately constant velocity. For values of applied voltage not exceeding approximately one and one-half times the threshold voltage, the next layer is not formed until the propagating domain has been collected at the anode.

Figure 4:
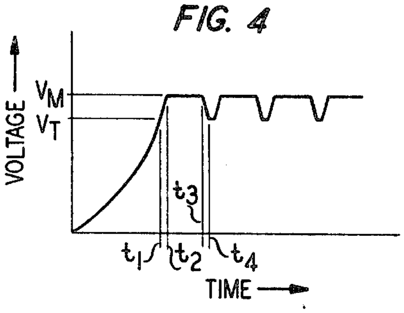
FIGS. 4 through 7 shows various waveforms that are helpful in explaining the mode of operation of the embodiments of FIGS. 1 through 3.

Nucleation of a domain within such an element or Gunn diode does not occur until the value of the voltage applied thereto reaches a so-called threshold level which, as indicated above, need be as a practical matter only in the range of tens of volts. Thus, for example as shown in FIG. 4, once the value of the voltage applied to a Gunn diode via a resistance reaches the threshold level $V_T$, the aforementioned oscillatory process begins. During that time interval $t_1$ through $t_2$ (which is typically about 100 picoseconds), initiation or buildup of this nucleation process occurs, whereas decay or collapse of the propagating domain takes place in the interval $t_3$ through $t_4$ (which is also about 100 picoseconds). In addition, the constant-amplitude nature of the voltage across the diode during the intermediate interval $t_2$ through $t_3$ (about 500 picoseconds) is depicted in FIG. 4. Subsequent self-starting periodic oscillations in the diode are also represented in FIG. 4. For each such oscillation the voltage difference $V_M-V_T$ approximates 4 volts.

Figure 1:
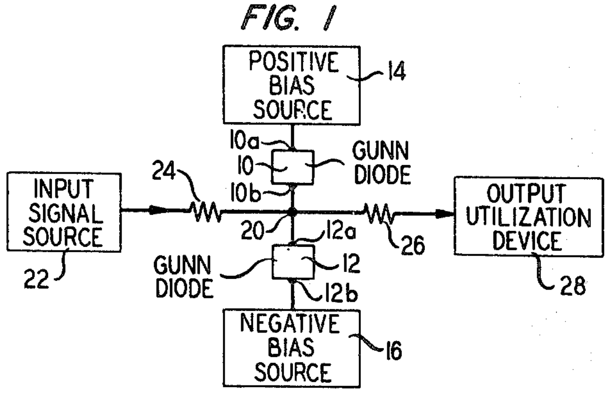
FIGS. 1 through 3 depict specific illustrative embodiments made in accordance with the principles of the present invention.

Fig. 1 shows a specific illustrative embodiment of the principles of the present invention. The depicted circuit includes two series-connected diodes 10 and 12, each having top and bottom ohmic contacts 10*a*, 10*b* and 12*a*, 12*b*, respectively, each of the diodes 10 and 12 being of the particular type described above in connection with FIG. 4. A positive bias source 14 is connected to the contact or terminal 10*a* and a negative bias source 16 is connected to the terminal 12*b*. (For illustrative purposes, positive and negative as used herein are assumed to be with reference to ground, although any other point of reference potential may be assumed.)

Advantageously the value of each of the sources 14 and 16 is selected to be slightly above $V_T$ (FIG. 4). Thus, for example, for a $V_T$ of 30 volts, the source 14 applies a positive voltage of 31 volts and the source 16 a negative voltage of 31 volts to the diodes 10 and 12. Accordingly, in the absence of oscillations in the diodes 10 and 12, a voltage drop of 31 volts appears across each of them. Under these conditions the voltage with respect to ground of a node point 20 is 0 volts. As soon as oscillations occur in one of the diodes 10 and 12, the voltage across the oscillating diode rises to about 35 volts and the internal field in the other diode is thereby caused to fall below the threshold value for oscillations therein. Control of which one of the diodes 10 and 12 can oscillate is accomplished in the manner described below.

Connected to the node point 20 between the diodes 10 and 12 of FIG. 1 is an input source 22. Signals are applied from the source 22 to the node point 20 via an isolating resistor 24. The direction of current flow in the resistor 24 is determinative of which one of the diodes 10 and 12 will oscillate. Thus, if the source 22 supplies a positive voltage at the time at which a domain is ready to nucleate in the depicted circuit, the lower diode 12 is thereby in effect selected to be the unit in which oscillations occur. Such a positive voltage causes current to flow from left to right in the resistor 24. On the other hand, a negative input signal and a consequent input current flow in the other direction at the time of domain nucleation cause oscillations to occur in the upper diode 10.

Figure 5:
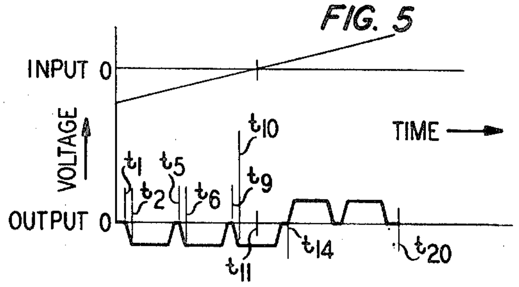

The controlled oscillatory behavior of the FIG. 1 circuit is represented in FIG. 5. During each of the indicated domain buildup intervals $t_1$ through $t_2$, $t_5$ through $t_6$, and $t_{10}$, the source 22 of FIG. 1 is assumed to be supplying a negative input voltage waveform of the type shown at the top of FIG. 5. Consequently, in each of the specified intervals a domain forms and subsequently propagates only in the upper diode 10 of FIG 1. Although the input waveform shown in FIG. 5 goes through 0 at time $t_{11}$ and then assumes positive values, the condition of the circuit does not change until the domain started in the diode 10 during the interval $t_9$ through $t_{10}$ has reached the anode thereof and collapsed. In other words, once a domain has formed in the selected diode, no domain will nucleate in the other diode during the transit time of the formed domain, even through the polarity of the input voltage undergoes a change during this time. (This is true provided that the amplitude of the input voltage is not more than that necessary to cause the field in the other diode to exceed its threshold value.)

At time $t_{14}$ (FIG. 5) another domain is about to be formed in the FIG. 1 circuit. AT this time the input voltage is positive. Accordingly, this next domain thereby controlled to nucleate in the lower diode 12. The resulting output waveform attributable to this next domain and to a subsequent one is represented in FIG. 5 in the interval $t_{14}$ through $t_{20}$. These positive-going oscillations will continue so long as the applied input signal remains positive.

The bottom waveform shown in FIG. 5 appears at the node point 20 of FIG. 1 and is coupled via an isolating resistor 26 to an output utilization device 28. Since this waveform undergoes a change in polarity very shortly after the depicted input signal rises above a 0 reference level, it is apparent that the FIG. 1 circuit constitutes a self-clocked detector for providing positive-going wave train whenever the input signal exceeds a 0 threshold value.

Figure 2:
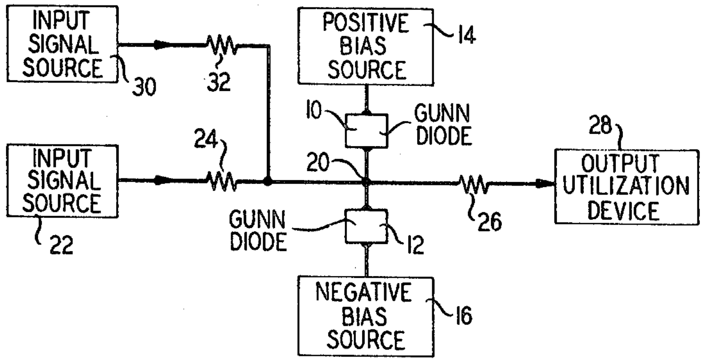

The threshold level at which the output signal of the FIG. 1 circuit undergoes a polarity change can easily be adjusted to be a value other than the 0 level shown in FIG. 5. Illustratively, this is accomplished by connecting an additional input source 30 to the node point 20 via an isolating resistor 22, as depicted in FIG. 2. (The other components included in FIG. 2 may be identical to the corresponding elements shown in FIG. 1 and, therefore, designated by the same reference numerals.) The source 30 can be adjusted, for example, to direct a constant value of current from left to right through the resistor 32 and into the node point 20. In this case and assuming that the source 22 continues to supply an input signal of the type represented in FIG. 5, the output waveform shown in FIG. 5 would undergo a transition from negative to positive at some time prior to $t_{11}$. Conversely, the transition from positive to negative can be delayed to occur at some time subsequent to the transition shown in FIG. 5 by arranging the source 30 to cause a current to flow from right to left through the resistor 32. Thus, the occurrence of the transition in the output waveform can be controlled simply by adjusting the magnitude and polarity of the constant input signal supplied by the source 30.

Figure 3:
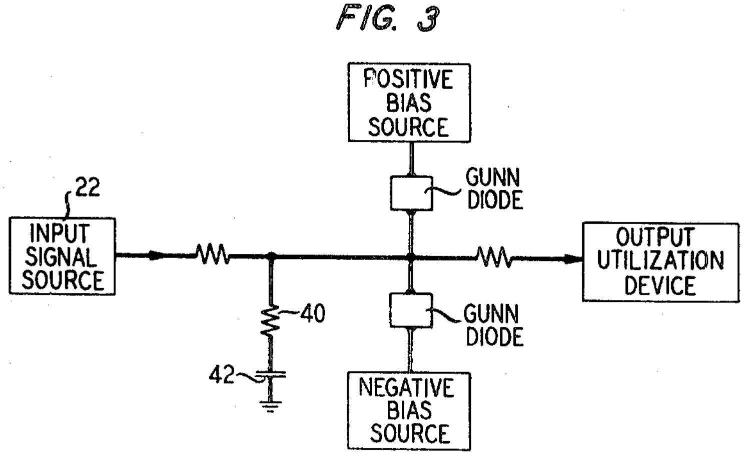

The basic circuit shown in FIG. as can be converted to a bistable arrangement for use as a countdown unit or flip-flop by adding a memory component thereto. FIG. 3 illustrates such a modification of the basic circuit. FIG. 3 is identical to FIG. 1, except that FIG. 3 includes an additional resistor 40 and a capacitor 42. The RC time constant of the elements 40 and 42 is selected to be less than one period of Gunn-diode oscillations. (A typical such period covers the interval $t_1$ through $t_5$ in FIG. 5.) As a result, once oscillating a diode will continue to oscillate until an input signal from the source 22 overcomes the preference provided by the capacitor 42.

The circuit shown in FIG. 1 is also adapted to be operated as a pulse regenerator. In this mode the source 22 of FIG. 1 ordinarily supplies a constant positive bias current such as that represented in the upper waveform of FIG. 6 in the interval $t_0$ through $t_1$. As a result of this quiescent bias condition, the lower diode 12 is selected for oscillation during the specified interval, as indicated by the lower waveform of FIG. 6. Subsequently in the interval $t_1$ through $t_5$ the input source supplies a negative-going pulse whose amplitude is sufficient to cause a reversal of the direction of current flow in the resistor 24. Consequently, when at time $t_2$ (see lower waveform of FIG. 6) an oscillation buildup commences, the buildup is controlled to occur in the upper diode 10. Accordingly, a single negative-going output pulse is generated. For oscillation buildup periods subsequent to $t_5$, the quiescent bias condition again exists and hence the output waveform resumes its positive-going nature.

Figure 6:
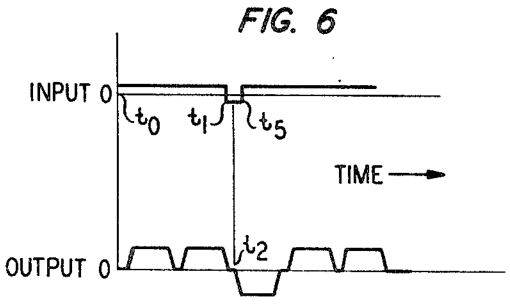

Pulse regeneration as illustrated in FIG. 6 has in practice been achieved by reversing the mode of operation of the FIG. 1 circuit for just one oscillatory period (about 700 picoseconds in duration). In accomplishing this reversal a voltage gain approximating 32 db at the common node was observed.

Figure 7:
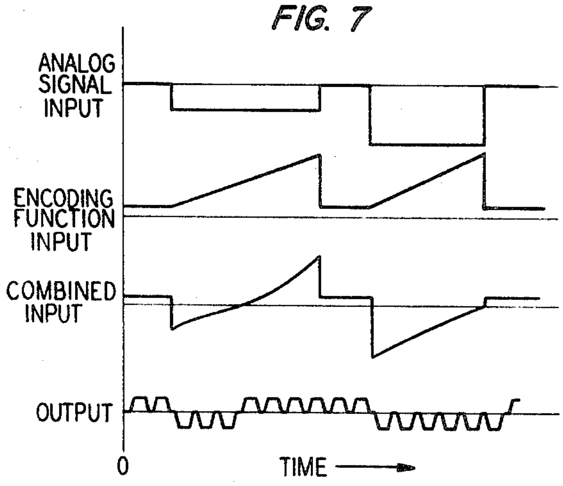

The versatility of the basic Gunn-diode circuit described herein is further illustrated by adapting it to operate as an analog-to-digitial converter. Thus, for example, assume that the source 30 of FIG. 2 supplies an analog signal to be encoded and that the source 22 thereof supplies a preselected encoding function signal during each interval in which an analog signal is supplied . Two illustrative such signals are respectively shown in the top two rows of FIG. 7, and the resultant of these two signals, which is applied to the node point 20, is represented in the third row of FIG. 7. In response to this resulting signal and in accordance with the mode of operation described hereinabove, it is apparent that the output waveform a applied to the utilization device 28 will be of the form represented in the last row of FIG. 7. For a particular repetitive encoding function signal the number of negative-going output pulses is related in a predetermined way to the amplitude of the input analog signal.

Thus, there have been described herein several unique solid-state circuits capable of performing various fundamental operations of practical importance. Each of these circuits exhibits a high sensitivity to input signals and provides an output signal that varies about ground level. Hence, the circuits are well suited to be combined with known solid-state elements such as, for example, tunnel diodes or bipolar transistors. In one such combination a Gunn-diode circuit made in accordance with the principles of this invention was successfully driven by applying to the node point thereof via a resistance a pulse obtained directly from the controlled switching of a tunnel diode.

It is to be understood that the above-described embodiments are only illustrative of the application of the principles of the present invention. In accordance with these principles numerous other arrangements may be devised by those skilled in the art without departing from the spirit and scope of the invention. Thus, for example, although the bias sources 14 and 16 shown in FIGS. 1 through 3 have been disclosed to be direct-current units, it is, of course, feasible to substitute therefor appropriately timed pulse sources. In addition, it is to be emphasized that the time periods and voltage values given in relation to the above-described circuits are typical of particular physical realizations thereof and are included only for illustrative purposes.

What is claimed is:

1. In combination, two Gunn-effect diodes connected in series, means for respectively applying oppositely poled bias voltages to said diodes for enabling one or the other of said diodes to oscillate, said voltages being of a magnitude such that in the absence of high-field domains in the diodes the internal field in each diode is above the threshold for domain nucleation and propagation and in the presence of a high-field domain in one diode the internal field available in the other diode is below the minimum value required to support domain nucleation, and means connected to a point between said diodes for controlling the oscillatory condition thereof.

2. A combination as in claim 1 further including output utilization means connected to said point.

3. A combination as in claim 2 still further including a memory element connected to said point for maintaining said diodes in the oscillatory condition last established by said controlling means.

4. In combination, an arrangement comprising two Gunn-diodes connected in series and having a node point defined therebetween, each of said diodes being adapted to have a high-field domain nucleated therein and propagated therethrough, means connected to the respective ends of said arrangement for applying oppositely poled bias voltages thereto of a magnitude such that in the absence of high-field domains in the diodes the internal field in each diode is above the threshold for domain nucleation and propagation and in the presence of a high-field domain in one diode the internal field available in the other diode is below the minimum value required to support domain nucleation, and means connected to said node point for controlling which one of said diodes is to propagate a domain.

5. A combination as in claim 4 further including output means connected to said node point.

6. A combination as in claim 5 further including a memory element connected to said node point for maintaining said diodes in the domain-propagating condition last established by said controlling means.

7. A combination as in claim 5 wherein said controlling means is adapted quiescently to supply a constant input signal of one polarity to said node point thereby to select one of said diodes for domain propagation therein and is adapted intermittently to supply a pulse-type signal of the other polarity to said node point thereby to select the other one of said diodes for domain propagation therein.

8. A combination as in claim 5 wherein said controlling means is adapted to supply an input signal characterized by a threshold level which is to be detected, and wherein said controlling means includes variable means for supplying a threshold setting input signal to said node point whereby one diode of said combination propagates domains when the input signal is below said threshold level and the other diode of said combination propagates domains when the input signal is above said threshold level.

9. A combination as in claim 5 wherein said controlling means includes means for supplying to said node point an input analog signal to be encoded and an input encoding function signal.